(12) United States Patent
Heimrath

(10) Patent No.: US 12,534,059 B2
(45) Date of Patent: Jan. 27, 2026

(54) CONTROL DEVICE AND METHOD FOR THE PREDICTIVE OPERATION OF AN ON-BOARD POWER SUPPLY SYSTEM

(71) Applicant: Bayerische Motoren Werke Aktiengesellschaft, Munich (DE)

(72) Inventor: Andreas Heimrath, Emmering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 186 days.

(21) Appl. No.: 18/011,409

(22) PCT Filed: Aug. 6, 2021

(86) PCT No.: PCT/EP2021/071966
§ 371 (c)(1),
(2) Date: Dec. 19, 2022

(87) PCT Pub. No.: WO2022/037968
PCT Pub. Date: Feb. 24, 2022

(65) Prior Publication Data
US 2023/0303053 A1    Sep. 28, 2023

(30) Foreign Application Priority Data

Aug. 19, 2020    (DE) .................. 10 2020 121 696.3

(51) Int. Cl.
*B60W 10/08*    (2006.01)
*B60W 50/00*    (2006.01)
*G05B 13/04*    (2006.01)

(52) U.S. Cl.
CPC ........ *B60W 10/08* (2013.01); *B60W 50/0097* (2013.01); *G05B 13/048* (2013.01)

(58) Field of Classification Search
CPC ............. B60W 10/08; B60W 50/0097; B60W 2520/06; B60W 2556/05; B60W 2556/20;
(Continued)

(56) References Cited

U.S. PATENT DOCUMENTS 8,862,374 B2 * 10/2014 Maura ................ G01C 21/3697
701/123
9,290,108 B2 *  3/2016 Payne ................ G01C 21/3461
(Continued)

FOREIGN PATENT DOCUMENTS

CN          104816722 A      8/2015
DE          103 02 060 A1    7/2004
(Continued)

OTHER PUBLICATIONS

DE-102015218169-A1 machine translation (Year: 2015).*
(Continued)

*Primary Examiner* — Angelina M Shudy
(74) *Attorney, Agent, or Firm* — Crowell & Moring LLP

(57) ABSTRACT

A control device for operating an on-board power supply system of a motor vehicle includes an input unit which is configured to determine operating parameters of the on-board power supply system of the motor vehicle and/or one or more environment parameters of the motor vehicle and to forward them to a processing unit of the control device. At least one environment parameter is a probability of an operating action of a third-party vehicle.

8 Claims, 6 Drawing Sheets

(58) Field of Classification Search
CPC ......... B60W 30/182; B60W 2050/046; B60W 2552/05; B60W 2556/50; B60W 2556/65; B60W 20/14; B60W 30/18127; B60W 50/045; B60W 20/12; G05B 13/048; B60Y 2200/92; Y02T 10/62

See application file for complete search history.

(56) References Cited

U.S. PATENT DOCUMENTS

| | | | |
|---|---|---|---|
| 9,327,712 | B2 | 5/2016 | Matthews |
| 9,446,682 | B2* | 9/2016 | Gauthier ............... G01C 21/343 |
| 9,522,669 | B2* | 12/2016 | Engman ............. G01C 21/3484 |
| 9,702,718 | B2* | 7/2017 | Payne ....................... B60L 3/04 |
| 9,759,573 | B2* | 9/2017 | Meyer ................ G01C 21/3469 |
| 9,810,543 | B2* | 11/2017 | Hoch .................... G01C 21/343 |
| 10,053,102 | B2* | 8/2018 | Hemes ................. B60W 10/06 |
| 10,093,304 | B2* | 10/2018 | Kapadia ............... B60W 20/12 |
| 10,137,880 | B2* | 11/2018 | Ogawa ................. B60W 20/14 |
| 10,343,633 | B2* | 7/2019 | Tseng ................. B60H 1/00778 |
| 10,579,953 | B2* | 3/2020 | Sujan ............... G06Q 10/08355 |
| 10,671,076 | B1* | 6/2020 | Kobilarov ............... G08G 1/166 |
| 11,152,653 | B2* | 10/2021 | Carlson ............... H01M 10/613 |
| 11,325,601 | B2* | 5/2022 | Grubwinkler ......... B60W 40/02 |
| 11,654,794 | B1* | 5/2023 | Khattar .................. B64U 50/19 244/6 |
| 11,958,499 | B2 | 4/2024 | Twumasi-Boakye ....................... B60W 50/0097 |
| 2004/0172186 | A1 | 9/2004 | Grill |
| 2005/0228553 | A1* | 10/2005 | Tryon ..................... B60L 50/16 701/22 |
| 2005/0274553 | A1* | 12/2005 | Salman ............... B60L 15/2045 180/65.28 |
| 2009/0114463 | A1* | 5/2009 | DeVault ................ B60W 20/12 180/65.29 |
| 2011/0060495 | A1* | 3/2011 | Kono ................ G01C 21/3469 701/31.4 |
| 2011/0196817 | A1* | 8/2011 | Pryakhin ................. G01C 21/26 706/14 |
| 2011/0313647 | A1* | 12/2011 | Koebler ..................... B60L 3/12 701/123 |
| 2013/0046466 | A1* | 2/2013 | Yucel ................. G01C 21/3469 701/538 |
| 2013/0261872 | A1* | 10/2013 | Ferguson ........... B60W 60/0011 701/28 |
| 2014/0236466 | A1* | 8/2014 | Doron ................... G06Q 10/06 701/123 |
| 2014/0277835 | A1* | 9/2014 | Filev ................. G01C 21/3469 701/2 |
| 2014/0343830 | A1* | 11/2014 | Elwart ................ F02N 11/0837 701/112 |
| 2014/0358841 | A1* | 12/2014 | Ono .................. B60W 30/0956 706/52 |
| 2015/0061550 | A1* | 3/2015 | Schulz .................. H02J 7/0047 318/376 |
| 2015/0217759 | A1 | 8/2015 | Wimmer et al. |
| 2015/0258984 | A1* | 9/2015 | Atluri ................. B60W 30/188 180/65.265 |
| 2015/0276420 | A1* | 10/2015 | McGee ................... B60K 35/28 701/123 |
| 2015/0298680 | A1* | 10/2015 | Matthews ............... B60W 10/08 180/65.265 |
| 2016/0025508 | A1* | 1/2016 | Meyer ................ G01C 21/3469 701/410 |
| 2016/0059733 | A1* | 3/2016 | Hettrich ................. B60L 58/27 701/2 |
| 2016/0061611 | A1* | 3/2016 | Meyer ................. G01C 21/3469 701/1 |
| 2017/0043790 | A1* | 2/2017 | Morisaki ............... B60W 10/08 |
| 2017/0072937 | A1* | 3/2017 | Kapadia ............. B60W 50/0097 |
| 2017/0080821 | A1* | 3/2017 | Hughes .................. B60L 58/25 |
| 2017/0137026 | A1* | 5/2017 | Hemes ................. B60W 10/20 |
| 2018/0029586 | A1* | 2/2018 | Dextreit ................ B60W 20/19 |
| 2018/0045526 | A1* | 2/2018 | Trancik ................ G06Q 10/06 |
| 2018/0174485 | A1* | 6/2018 | Stankoulov .......... G09B 19/167 |
| 2018/0178668 | A1* | 6/2018 | Ichikawa ............... B60W 20/13 |
| 2018/0334170 | A1* | 11/2018 | Liu ........................ B60W 10/30 |
| 2019/0047572 | A1* | 2/2019 | Bennett .................... B60K 6/46 |
| 2019/0054925 | A1 | 2/2019 | Froeschl et al. |
| 2019/0106114 | A1* | 4/2019 | Rocci ............... G08G 1/096775 |
| 2019/0232950 | A1* | 8/2019 | Atluri ..................... H04W 4/02 |
| 2019/0256096 | A1* | 8/2019 | Graf ..................... G08G 1/0129 |
| 2019/0283589 | A1* | 9/2019 | Koebler ................. G07C 5/085 |
| 2019/0283592 | A1* | 9/2019 | Koebler ................. B60L 58/16 |
| 2019/0283593 | A1* | 9/2019 | Koebler ................... B60T 1/10 |
| 2019/0283604 | A1* | 9/2019 | Koebler ................. B60L 50/62 |
| 2019/0315232 | A1* | 10/2019 | Ing .......................... B60L 58/26 |
| 2019/0339085 | A1* | 11/2019 | Naef ..................... G01C 21/26 |
| 2020/0130570 | A1* | 4/2020 | Elli ....................... B60Q 1/545 |
| 2020/0172081 | A1* | 6/2020 | Sakayanagi .......... B60W 40/105 |
| 2020/0276972 | A1* | 9/2020 | Ito .................. B60W 30/18072 |
| 2020/0298825 | A1 | 9/2020 | Kurihashi |
| 2020/0326719 | A1* | 10/2020 | Tram ....................... G06N 3/08 |
| 2021/0031803 | A1* | 2/2021 | Cussigh ............... B60W 50/082 |
| 2021/0382534 | A1* | 12/2021 | Cili ........................ G06F 1/206 |
| 2021/0397192 | A1* | 12/2021 | Alberts ................ B60W 40/10 |
| 2021/0404825 | A1* | 12/2021 | Kageura ............... B60W 20/11 |
| 2022/0069636 | A1* | 3/2022 | Lu ............................ G08G 1/127 |
| 2022/0072975 | A1* | 3/2022 | O'Gorman .............. B60L 53/00 |
| 2022/0126826 | A1* | 4/2022 | Wang .................. B60W 40/105 |
| 2022/0146272 | A1* | 5/2022 | Verma ................ G01C 21/3446 |
| 2022/0161822 | A1* | 5/2022 | Fonseca ............... G05D 1/0088 |
| 2022/0227368 | A1* | 7/2022 | Roth .................... B60L 15/2045 |
| 2022/0391700 | A1* | 12/2022 | Graf ..................... B60R 16/033 |
| 2023/0134925 | A1* | 5/2023 | Alberts ............. B60W 50/0097 701/36 |
| 2023/0147000 | A1* | 5/2023 | Heiden ................ B60W 60/001 706/25 |
| 2023/0184559 | A1* | 6/2023 | Wedekind .......... G01C 21/3469 701/31.4 |
| 2023/0228581 | A1* | 7/2023 | Askerdal ................. H04W 4/44 701/123 |
| 2023/0234592 | A1* | 7/2023 | Masquelier ............ G06Q 50/40 701/1 |
| 2024/0174123 | A1* | 5/2024 | Eto ...................... B60L 15/2045 |
| 2024/0247940 | A1* | 7/2024 | Kotzor ............... G01C 21/3617 |

FOREIGN PATENT DOCUMENTS

| | | |
|---|---|---|
| DE | 10 2011 085 347 A1 | 5/2013 |
| DE | 10 2016 116 295 A1 | 3/2017 |
| DE | 102015218169 A1 * | 3/2017 |
| DE | 10 2017 213 165 B3 | 1/2019 |
| DE | 10 2017 214 384 A1 | 2/2019 |
| DE | 102018205797 A1 * | 10/2019 |
| EP | 2 826 688 A1 | 1/2015 |
| JP | 2015-50927 A | 3/2015 |
| JP | 2020-27023 A | 2/2020 |
| JP | 2020-83235 A | 6/2020 |
| JP | 2020-153950 A | 9/2020 |
| WO | WO 2018/054914 A1 | 3/2018 |

OTHER PUBLICATIONS

DE-102018205797-A1 machine translation (Year: 2018).*
International Search Report (PCT/ISA/210) issued in PCT Application No. PCT/EP2021/071966 dated Nov. 23, 2021 with English translation (seven (7) pages).
German-language Written Opinion (PCT/ISA/237) issued in PCT Application No. PCT/EP2021/071966 dated Nov. 23, 2021 (six (6) pages).
German-language Search Report issued in German Application No. 10 2020 121 696.3 dated Apr. 7, 2021 with partial English translation (11 pages).
Heimrath A et al., "Reflex-Augmented Reinforcement Learning for Electrical Energy Management in Vehicles", Int'l Conf. Artificial Intelligence, ICAI'18, 2018, pp. 429-430, Garching, Germany (two (2) pages).
Korean-language Office Action issued in Korean Application No. 10-2022-7043060 dated Sep. 7, 2024 with English translation (8 pages).

(56) References Cited

OTHER PUBLICATIONS

Japanese-language Office Action issued in Japanese Application No. 2022-580793 dated Jul. 17, 2025 with English translation (17 pages).
Chinese-language Office Action issued in Chinese Application No. 202180044737.1 dated Aug. 27, 2025 with English translation (20 pages).

\* cited by examiner

CONTROL DEVICE AND METHOD FOR THE PREDICTIVE OPERATION OF AN ON-BOARD POWER SUPPLY SYSTEM

BACKGROUND AND SUMMARY OF THE INVENTION

The invention relates to a control device and a method for operating an on-board power supply system of a motor vehicle. The invention also relates to a central database device that can communicate, in particular, with the control device.

In many known operating methods of on-board networks, particularly in hybrid vehicles, the operating actions required to continue operating the on-board network (in particular to regulate the traction provided by the electric motor of the hybrid vehicle) are determined only in accordance with the operating parameters of the vehicle itself.

With the advent of navigation systems and accompanying technologies, such as the assignment of terrain parameters (or general environmental parameters) to georeference points on the navigation system maps, it is now possible to provide operating actions to regulate the drive in accordance with such conditions, for example, a downward slope on the planned route. In this case, for example, it may be possible to actively discharge the battery before the slope at an initial high battery charge level in order to be able to fully absorb the "free" energy obtainable by regeneration on the slope.

With the increase in the transmission capacity of mobile networks, it is also gradually becoming possible to incorporate operating states and/or operating parameters of other vehicles into the control of the ego-vehicle. Systems with such functionalities are documented, for example, in DE 10 2017 214 384 A1 or U.S. Pat. No. 9,327,712 B2.

However, due to the large number of operating parameters to be considered, it is difficult to find a sufficiently suitable "model" to use as a reference point for the control of the vehicle being monitored for the conditioning of the control system of the ego-vehicle—because in addition to the vehicle type, the time of day and the exact location, a specific state of the vehicle must also be transmitted in order to ensure that precisely this vehicle can be considered a "model". And this specific state is in turn obtained from a large number of operating parameters of the other vehicle, all of which then have to be transmitted. Such a solution therefore requires the exchange of large amounts of data and for a given location reference it is also uncertain whether a suitable "model" which has already deposited data there will always be available.

Against this background, one of the objects of the invention is to improve the operation of an on-board network control system in a motor vehicle, in particular with regard to a resource-optimizing prediction of expected charge flows in the on-board network.

This object is achieved by a control device, a method, and a central database device having the features of the claimed invention.

According to one aspect, a control device for operating an on-board power supply system of a motor vehicle is specified, wherein the motor vehicle in particular has a hybrid drive with an electric motor and an internal combustion engine or at least one internal combustion engine and an energy regeneration capability.

The control device has an input device which is designed to ascertain, in particular to acquire, operating parameters of the on-board power supply system (i.e. in particular an operating state) of the motor vehicle and/or one or more environmental parameters of the vehicle (i.e. in particular an environmental state) and, in particular, in order to determine an on-board network operating action, to forward them to a processing unit of the control device. At least one environmental parameter is a probability of a third-party vehicle operating action, wherein the third-party vehicle operating action can be, for example, an active regeneration of the electric motor or an activated start/stop functionality (i.e. a combustion engine that is temporarily switched-off).

This allows for a better prediction of the future operating state of the on-board network, for example a better prediction of an amount of charge expected to be available for the on-board network in the near future (for example within a prediction horizon)—while at the same time maintaining a small amount of data to be provided or transferred (to the input unit) and/or greater independence from other operating parameters of third-party vehicles. This also provides an improved opportunity to condition an energy storage unit of the on-board network optimally to an expected amount of charge, so that sufficient storage space is available and/or can be filled at an optimum charge level.

In addition, the use of a probability for a certain operating action for other vehicles in a fleet (=third-party vehicles), allows for certain predictions—such as a regeneration prediction—the use of a reliable metric for environmental conditions which on the basis of their characteristics are difficult to determine deterministically and physically. This is the case, for example, with a regeneration prediction in flat terrain, whereas in the case of strongly sloping roads a deterministic determination of an expected amount of charge is possible with high quality depending on parameters such as the vehicle weight and speed.

In particular, the control device also has a processing unit for implementing an operating strategy and an output unit for outputting corresponding control commands.

In particular, a control device is understood here to mean an on-board network control device that has been expertly designed independently of all embodiments of the invention, in particular for a motor vehicle with hybrid drive.

The term "control" is to be interpreted broadly and may in particular include "regulation".

"Ascertain" can be understood here to mean any way of discovering or making a value of a parameter available; "acquire" can be understood here in particular to mean making available a value of a parameter ascertained by way of a sensor device.

The term "operating state" can be understood here as the entirety of the instantiations (the terms instantiation and value can be used interchangeably here) of operating parameters relevant to an analysis. The term "environmental state" can be understood here as the entirety of the instantiations (=values) of environmental parameters relevant for an analysis.

In particular, an on-board network operating action is defined here as an action of the on-board network that is aimed at an, in particular desired, change in the operating state of the motor vehicle.

In accordance with another aspect, a method for operating an on-board power supply system of a motor vehicle is specified, having at least the following steps, which can be taken in the order indicated or in any other, technically appropriate order:

(a) ascertaining a value, in particular a current and/or currently available value, of each of the operating parameters of the on-board power supply system and/or of one or more environmental parameters of the vehicle, at least one of the environmental parameters being a probability of a third-party vehicle operating action.
(b) forward the ascertained values to a processing unit of the control device.
(c) determining an, in particular possible, on-board network operating action depending on the values ascertained, in particular on the ascertained probability of the third-party vehicle operating action.

In particular, values of the operating parameters of the on-board power supply system and/or of one or more environmental parameters of the vehicle can be ascertained using the input unit of the control device.

According to one embodiment, the ascertained values of the parameters are forwarded to the processing unit of the control device.

According to one embodiment, the probability of a third-party vehicle operating action is ascertained by
(a1) determining an expected route of the vehicle currently being examined,
(a2) determining a probability of the third-party vehicle operating action for all georeference points on this route.

According to one embodiment, the on-board network operating action is determined according to the ascertained probabilities of the third-party vehicle operating action, by
(c1) taking into account all probability values that are above a relevance threshold and the georeference points of which are within a prediction horizon, and/or
(c2) an expected charge contribution is determined for each of the probability values or the georeference point considered, and/or
(c3) a sum of the expected charge contributions is transmitted to the input unit, and/or
(c4) the processing unit decides on the on-board network operating action on the basis of the sum.

According to one embodiment
(c_i) the on-board network operating action is determined based on a learned operating strategy, in particular of an adaptive processing unit of the motor vehicle control device, and/or
(c_ii) the on-board network operating action is verified on the basis of a predefined verification strategy, in particular of a reflex unit of the processing unit of the motor vehicle control device.

Thus, an (environmental) probability-based prediction can contribute to a faster and/or improved learning of an efficient operating strategy for the on-board network, wherein according to one embodiment an effective control can still be provided by the reflex unit. In this way, updated (i.e. current) probabilities can contribute to a continuous refinement of the operating strategy, because with the security provided by the monitoring of the proposed on-board network operating actions by the reflex unit, the adaptive unit can also continue learning in normal customer operation.

According to one embodiment, the processing unit has an adaptive unit that is configured to output a possible on-board operating action based on a learned operating strategy. In particular, the processing unit has a reflex unit configured to verify the possible operating action based on a predefined strategy. Examples of such a processing unit and associated reflex-augmented reinforcement learning algorithms are shown in the publication "International Conference on Artificial Intelligence ICAI 18, pages 429-430, ISBN: 1-60132-480-4, published in CSREA Press", but also in DE 10 2017 214 384 A1.

According to another aspect, a central database device is specified, in particular a server with a database and a communication device for data exchange with the vehicle under observation and all other vehicles in a vehicle fleet.
The device is configured
(i) to receive and, where appropriate, store an indicator of an operating action at or near to a georeference point from a plurality of third-party vehicles, in particular via a mobile communication connection of the communication device, and/or
(ii) to ascertain a probability of the presence of the operating action at the georeference point from the transmitted values of the indicator, and/or
(iii) to transmit the probability of the georeference point thus ascertained (i.e. the probabilities belonging to the georeference point) to a control device of a motor vehicle, which device is designed in particular according to any of the embodiments discussed herein, in particular via the mobile communications connection.

This allows each vehicle in the fleet to be provided, at each georeference point, with a value of a probability of a specific operating action for all or all relevant third-party vehicles that have passed the georeference point.

According to one embodiment, all vehicle-related operating parameters of each vehicle in the fleet concerned for the time point are stored in a georeference point data record in the database of the central database device for each georeference point of the relevant map. In addition, the georeference point data record contains in particular all environment-related parameters of the georeference point.

In particular, from certain operating parameters transmitted by the individual third-party vehicles, e.g. an indicator of a regeneration operation or an active automatic start-stop system, it is possible to determine the probabilities for the presence of an operating action in relation to all vehicles or all relevant third-party vehicles with respect to a particular parameter-value combination.

In particular, the data transfers take place between each of the third-party vehicles and the central database device for storing the values of the parameters at a georeference point, and between the central database device and the vehicle currently under examination for retrieving the probability and, if appropriate, the required parameter values, by way of a data connection and/or a mobile communication network.

Whether a third-party vehicle or a dataset of a third-party vehicle is considered relevant to the requesting vehicle can be decided, for example, depending on the vehicle class and/or a time of day and/or a type of day, etc.

According to one embodiment, the probability in question is calculated from a ratio of the number of relevant third-party vehicles that have passed the requested georeference point and the number of vehicles among those third-party vehicles examined in which the operating action, for which the probability of its presence is queried, was present (or at least present to a relevant degree).

The invention is based, inter alia, on the idea that georeferenced probabilities for regeneration can be used to increase the efficiency of the control algorithms, in particular—but not only—in a method using artificial intelligence (e.g. reinforcement learning (RL) or reflex-augmented reinforcement learning (RARL)).

The approach of a prediction based on probabilities of occurrence of an operating action at a georeference point can also be applied, for example, to the occurrence of a start/stop situation. However, the invention and its embodiments are explained below based primarily on the example of a regeneration prediction.

According to one embodiment, a map with fleet data is used, in which probabilities of regeneration (i.e. an active regeneration of the electric motor of the vehicle drive) at georeference points along an expected route of the vehicle are stored. Probabilities of regeneration at the reference points are stored in this map.

The route information from the navigation unit can be used in one embodiment to determine the georeference points that the vehicle will pass in the next few seconds (for example, a prediction horizon of 10 or 30 seconds).

For example, according to one embodiment, in measurement campaigns during vehicle development and/or in real time with online querying from a central database device, characteristic charges to be expected in a vehicle type for the road type and for a given speed interval are determined.

For example, only reference points with a probability of regeneration above a relevance threshold (e.g. a threshold of 75%) are taken into account.

For example, the data is sent to the vehicle from the backend—i.e. the central database device—in real time or updated on a daily basis, or is stored there in a basic version. Alternatively, according to one embodiment, if the database is insufficient the characteristic charges can be calculated in the vehicle using physical models (e.g. kinetic energy, gradient, etc.).

For all georeference points in the prediction horizon with a probability of regeneration above the relevance threshold, according to one embodiment the characteristic charges for the road type and the expected speed of the vehicle (for example, using congestion prediction) are added together so that a predicted charge can be determined for the prediction horizon.

The predicted charge of the prediction horizon is transferred to the energy management algorithm (e.g. RARL), according to one embodiment. If the vehicle is expected to be charged by regeneration, for example, operating actions can be activated which result in a less intensive charging or even a slight discharging of the energy storage system of the vehicle drive in the on-board network. Thus, the energy storage unit can be preconditioned in order to be able to absorb the entire energy from the predicted regeneration. Without preconditioning, it might not be possible to absorb all the energy from regeneration, or only in a battery charge range with poor charging acceptance, which would result in lower vehicle efficiency.

According to one embodiment, the probability of a third-party vehicle operating action is determined from the presence or absence or a degree of the third-party vehicle operating action in a plurality of third-party vehicles.

By determining a probability of a particular operating action from the corresponding situation of multiple different third-party vehicles, for example at the same location and/or at the same time and/or belonging to the same vehicle type etc., the vehicle currently under examination can be assigned an improved prediction for its own on-board network operating actions. This applies in particular if the vehicle under examination is in the situation (for example, location, time, vehicle type, etc.) for which the probability of the third-party vehicle operating action was ascertained.

A third-party vehicle operating action is understood in particular to mean an operating action (e.g. a drive, consumer and/or on-board network operating action) of a different vehicle, in particular of the fleet.

According to one embodiment, the probability is linked to a georeference, so that in particular the probability of the third-party vehicle operating action is ascertained for a specific georeference point.

This enables the prediction of an operating state and/or an operating parameter to be made for specific locations—and thus in particular also for an expected route of the vehicle along a plurality of consecutive georeference points.

In particular, the presence or absence or the degree of the third-party vehicle operating action is ascertained for each of the third-party vehicles at a georeference point or, where applicable, in a georeference region around the point.

In particular, a georeference point in the present case is understood to mean a coordinate pair (or another suitable definition of an area-less point) on a map, in particular of a navigation system, of the vehicle. Even if the georeference point is specified as a coordinate pair, values of operating parameters or operating actions ascertained at this georeference point can refer to a georeference region surrounding the georeference point. For example, two adjacent georeference points can have a georeference region that extends to the center of the distance between the two georeference points.

According to one embodiment, the control device has a processing unit that is designed to determine an on-board network operating action depending on the ascertained probability. This allows the ascertained probability value for the third-party vehicle operating action to be included in the determination of the on-board network operating action to be selected.

According to one embodiment, the control device has an output unit that is design to output a control command for the operation of the on-board power supply system based on the determined on-board network operating action, in particular if the verification by the reflex unit is positive.

According to one embodiment, the processing unit is designed to determine the on-board network operating action according to a plurality of probabilities of the third-party vehicle operating action. This can improve the estimation quality of the probabilities used as an overall indicator for a prediction.

In particular, the probabilities at different georeference points are ascertained, wherein in particular each of the probabilities is ascertained at a different georeference point.

According to one embodiment, the probabilities of consecutive georeference points along an expected route of the motor vehicle are ascertained. This allows the prediction of an operating state and/or an operating parameter to be related to situations that are similar due to the underlying location.

For example, the probability of the presence of a regeneration operating action in other vehicles at one specific or multiple georeference points can be used to decide whether or not conditioning of a vehicle's own energy storage unit in the light of a possible expected charge quantity is appropriate for the vehicle currently under consideration.

An expected route can be understood in this case in particular to mean the route currently planned by the navigation system and/or considered the most likely, in particular for the immediate future on the order of a few seconds to a few minutes.

According to one embodiment, the set of the probabilities, in particular the set of consecutive georeference points at which the probability is determined in each case, is bounded by a prediction horizon.

This means that the prediction—and hence in particular also the necessary data transfer—can be limited to the time window after which no further meaningful reductions are possible anyway, because the probability of occurrence of a predicted scenario becomes smaller and smaller due to the increasing number of intervening factors that deviate from the predicted scenario.

In particular, the prediction horizon is defined by an expected time delay until the corresponding georeference point is reached, or by a number of consecutive georeference points.

According to one embodiment, the on-board network operating action is determined, in particular only, on the basis of those georeference points for which the calculated probability value of the third-party vehicle operating action meets at least one relevance threshold, in particular of 60% or 75% or 90%.

This ensures that the only probabilities or georeference points used to determine the on-board network operating action are those which, because of their clear tendency, are actually in a position to contribute to an improvement in the prediction (in particular compared with a physically determined determination, for example an expected charge quantity for the energy storage units of the vehicle).

According to one embodiment, the processing unit is designed to determine an expected charge quantity at each of the georeference points considered.

This enables the processing unit to be provided with a reliable basis for decision-making in the form of a parameter which enables an assessment of the size of the expected benefit (e.g. optimized charge) in relation to the disadvantage to be incurred (e.g. pre-conditioning of the energy storage units of the vehicle).

Which georeference points need to be taken into account is determined in particular with regard to or as a function of the relevance threshold and/or the prediction horizon and/or the expected route of the vehicle.

The expected charge quantity is determined in particular as a function of the environmental parameters recorded at the georeference point and/or of at least one operating parameter of the third-party vehicles.

An expected charge quantity is understood to mean in particular a charge quantity derived from the environmental parameters and the operating parameters of the vehicle at one specific, or at specific adjacent georeference points, taking into account the probability/ies ascertained.

According to one embodiment, the processing unit is designed to determine the on-board network operating action on the basis of a characteristic indicator of the georeference point as a function of (I) the probability of the third-party vehicle operating action, or (II) one or more other environmental parameters known at the georeference point.

As the processing unit can decide on the basis of the characteristic indicator whether a prediction based on the physical relationships between the operating parameters and the environmental parameters of the vehicle is more promising, or a prediction based on the probability values for the operating action of the third-party vehicles examined, the better prediction basis can always be chosen for each georeference point.

The use of the probability for a specific operating action for other vehicles, for specific predictions—such as a regeneration prediction—allows the use of a reliable metric for environmental conditions which, on the basis of their characteristics, are difficult to determine deterministically and physically.

This is the case, for example, for a regeneration prediction in flat terrain, whereas in the case of strongly sloping roads a deterministic determination of an expected amount of charge is possible with a high probability based on parameters such as the vehicle weight and speed. In cases such as the last example mentioned, the physical context can be used instead of the probability to determine the on-board network operating action to be selected.

The facility to choose the prediction basis can therefore increase the efficiency of the electrical on-board power supply system. In particular, a characteristic indicator can assume the values "deterministic" or "probabilistic", for example.

The value "deterministic" can be assigned, for example, if a regeneration potential for a georeference point can be calculated quasi-deterministically as a function of the gradient, the vehicle weight and the speed, or if the presence of a start-stop shutdown of the combustion engine at a georeference point can be calculated quasi-deterministically as a function of the time of day or a type of day (e.g. working day, public holiday, weekend day, travel day, holiday on a commuter route, etc.).

The value "probabilistic" can be assigned, for example, if the georeference point is located on a flat road with different influences on the regeneration potential that are not rule-governed, or if a start-stop shutdown of the internal combustion engine is occurring.

According to one embodiment, the control device, in particular the input unit, is designed to acquire the values of the environmental parameters for the georeference points (i) online and/or on demand from a central database device, and/or (ii) from a memory of the control device, in particular of the processing unit.

The acquisition from the central database device, in particular a backend server, allows a constant updating of the probability data, inter alia.

The acquisition from a memory of the control device, where the probability data can be imported or updated, in particular during assembly or workshop maintenance of the vehicle, enables embodiments of the invention to be used without a data connection and/or a mobile communication network.

In accordance with one embodiment, a mixed operation is also provided, in which a probability data record stored in the local memory of the control device is not updated to the latest version in real time, but only at regular or freely selectable or predefined intervals with data that has been updated in the meantime (update operation).

According to one embodiment, the third-party vehicle operating action for which the probability is ascertained is at least one action from the following group: (1) a regeneration operation of the electric drive of the third-party vehicle, and/or (2) a temporary shutdown of the internal combustion engine of the third-party vehicle followed by a restart, and/or (3) a demand for consumer power in the on-board power supply system that is above a high-power limit or below a low-power limit.

According to one embodiment, values for different parameters can therefore be ascertained/transmitted at each georeference point for vehicles passing by and stored in an, in particular central, database device, in particular:
(1) Spatial definition of the georeference point: $P_{ref}$ (e.g. x-coordinate, y-coordinate, if applicable, radius or similar description of a surrounding area
(2) Examples of operation(-related) parameters:
vehicle class and/or weight class
vehicle speed
time of day (e.g. morning, afternoon, evening, night)
type of day (e.g. working day, public holiday, weekend day, travel day, holiday on a commuter route, etc.)
direction of travel
regeneration on/off/degree if applicable automatic start/stop mode with internal combustion engine off/on/duration if applicable current consumer output etc.

(3) Examples of environment(-related) parameters:

probability of a regeneration operation in vehicles that have passed the georeference point, during their passage probability of an activated stop/start device in vehicles that have passed the georeference point, during their passage probability of an atypical consumer output of at least one consumer connected to the on-board power supply in vehicles that have passed the georeference point, during their passage characteristic indicator: "deterministic" or "probabilistic"

time of day (e.g. morning, afternoon, evening, night)

type of day (e.g. working day, public holiday, weekend day, travel day, holiday on a commuter route, etc.)

direction of travel road type (e.g. inner city, overland, freeway)

slope of road G (e.g. as a percentage)

etc.

The vehicle-related parameters are ascertained in accordance with one embodiment both from third-party vehicles and the vehicle currently being observed, used internally and, if appropriate (if a corresponding function is enabled) transmitted to the central database device for each georeference point passed.

Further advantages and applications of the invention can be found in the following description in connection with the drawings.

DETAILED DESCRIPTION OF THE DRAWINGS

Figure 1:
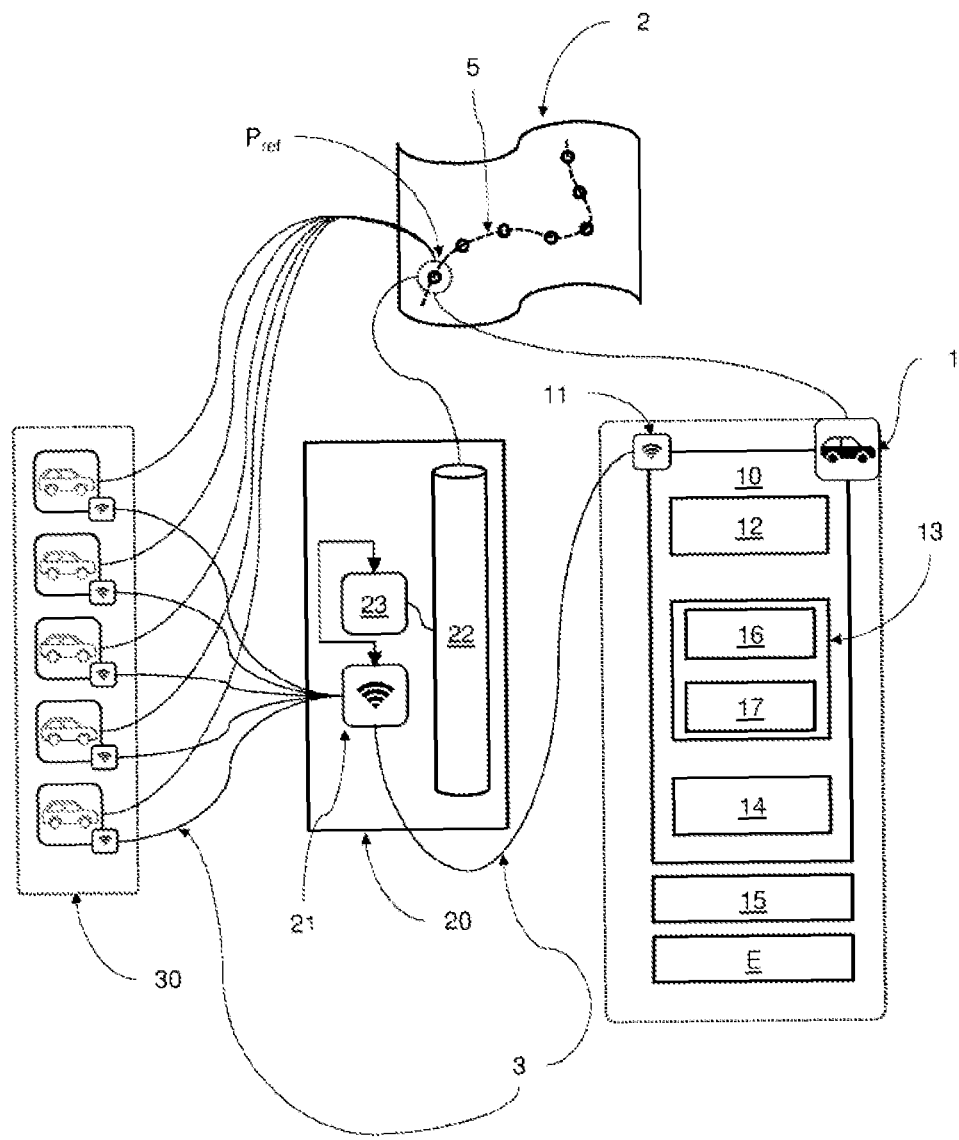
FIG. 1 shows a diagram of the interaction of a control device according to an embodiment of the invention with a central database device according to an embodiment of the invention, and a third-party vehicle fleet.

FIG. 1 shows a diagram of the interaction of a control device 10 of a vehicle 1 according to an exemplary embodiment of the invention with a central database device 20 according to an exemplary embodiment of the invention and with a third-party vehicle fleet 30 with a plurality of third-party vehicles. The diagram also shows a map 2, the underlying navigation data records of which—and in particular the georeference points $P_{ref}$ specified on the map—are available both to the vehicle 1 and its control device 10, as well as to the central database device 20.

The vehicle 1 has a communication device 11, which is also connected to the control device 10 of the vehicle 1 and is designed to exchange data with a communication device 21 of the central database device 20. In particular, this data exchange takes place over a mobile communication network 3. The vehicle 1 supplies the central database device 20, in particular, with values of the operating parameters available in the on-board network (i.e. an operating state BZ) for each georeference point $P_{ref}$ the vehicle has passed, and receives values for environmental parameters for the georeference points $P_{ref}$ to be passed in the near future, and also values of the probabilities (in the exemplary embodiment at least a probability of a regeneration operation $W_{REKU}$, and possibly a probability of an automatic start/stop operation $W_{SSA}$) of specific third-party vehicle operating actions, such as a regeneration operation REKU (and possibly an automatic start/stop operation SSA).

The control device 10 has an input unit 12, a processing unit 13 and an output unit 14, and is designed to control an on-board network 15 of the motor vehicle 1 using this topology.

The processing unit 13 in the exemplary embodiment is designed as a learning system, having a learning unit 16 for decision-making regarding possible on-board network operating actions B, and a reflex unit 17 for verifying the decision proposals of the learning unit 16.

Each of the vehicles of the third-party vehicle fleet 30 also has a communication device, which also transfers the current values of the operating parameters (summarizing the operating state) to the central database device 20 at each georeference point $P_{ref}$ that is passed and stores them there in a database memory 22.

In addition to communication device 21 and database memory 22, the database device 20 has a computing server 23 which controls the database device 20 and manages the data inputs and data outputs in response to requests from vehicles 1.

The database memory 22 maintains for each georeference point $P_{ref}$ a georeference point data record, which contains the values of the environmental parameters of the point (the environmental state) as well as the plurality of stored operating states of the third-party vehicles from the fleet 30 as they each pass the respective georeference point, wherein each operating state is defined by the total set of values of the individual operating parameters. In addition, each of the georeference point data records for the relevant point $P_{ref}$ contains a value—updated continuously or at predetermined intervals—of a probability of a specific on-board network operating action (in the implementation example REKU and/or SSA) in relation to the operating states of the previously stored passages of the various third-party vehicles at the georeference point.

Specifically, such a georeference point data record in the exemplary embodiment contains values for some or all of the following parameters:

(1) Spatial definition of the georeference point: $P_{ref}$ (2) Operating parameters of the vehicles that have passed the georeference point in the past:

vehicle class: K vehicle speed: v time of day: t type of day: d direction of travel: R indicator for regeneration operation during the passage: $i_{REKU}$ if applicable, an indicator of whether stop/start device is activated during passage: $i_{SSA}$;

if applicable, indicator for an atypical consumer output of at least one consumer connected to the on-board network during passage: $i_{VL}$ (3) Environmental parameters:

probability of REKU during the passage: $W_{REKU}$ if applicable, probability of SSA during the passage: $W_{SSA}$ if applicable, probability of VL during the passage: $W_{VL}$ characteristic indicator $I_C$ direction of travel: R road type: S slope of the road: G Based on FIGS. 2 to 6, an exemplary embodiment of a method according to the invention for operating the on-board network 15 in the infrastructure described in FIG. 1 is explained in more detail below.

Figure 2:
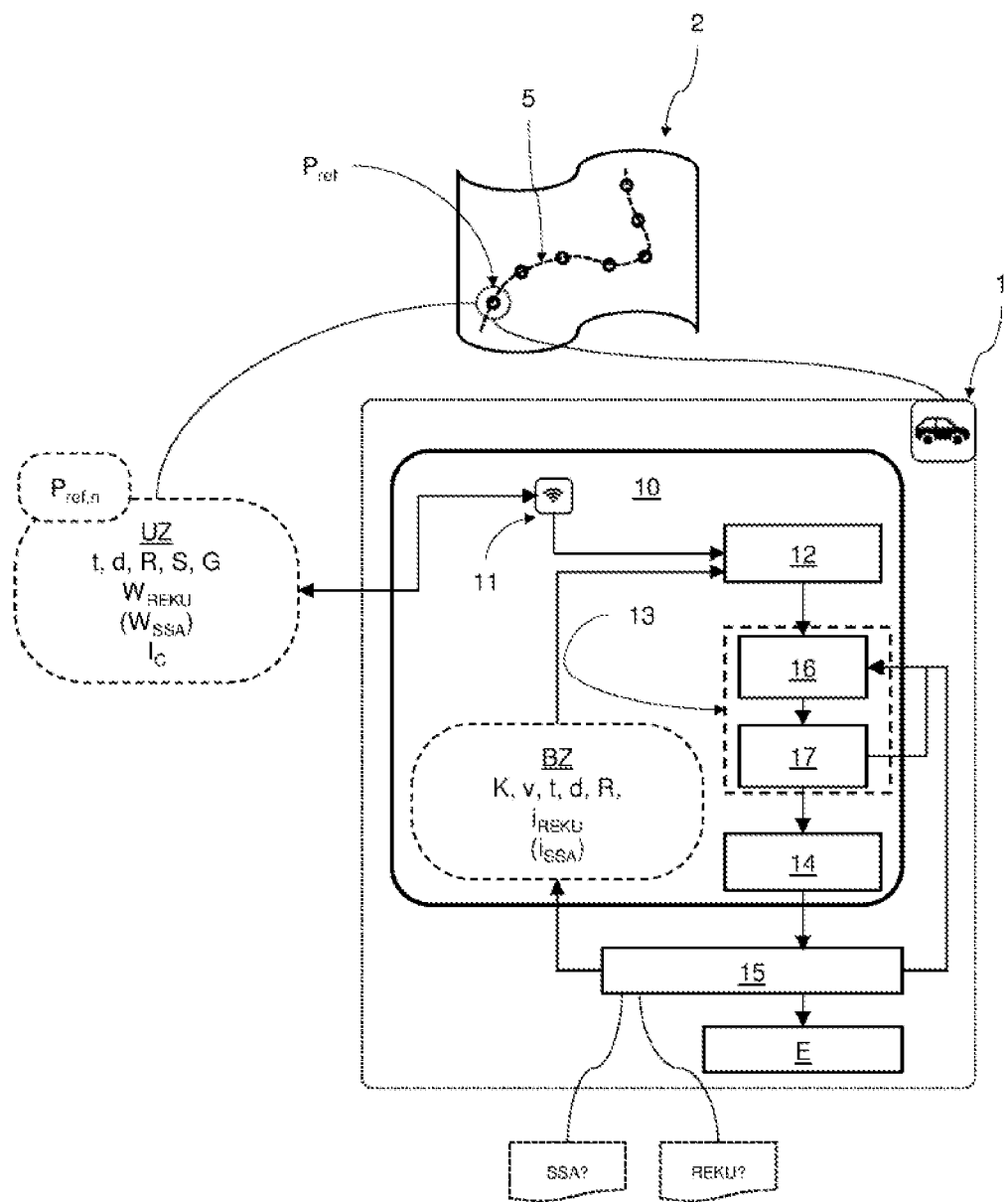
FIG. 2 shows a schematic view of the control device from FIG. 1 when carrying out a method according to one embodiment of the invention.
Figure 3:
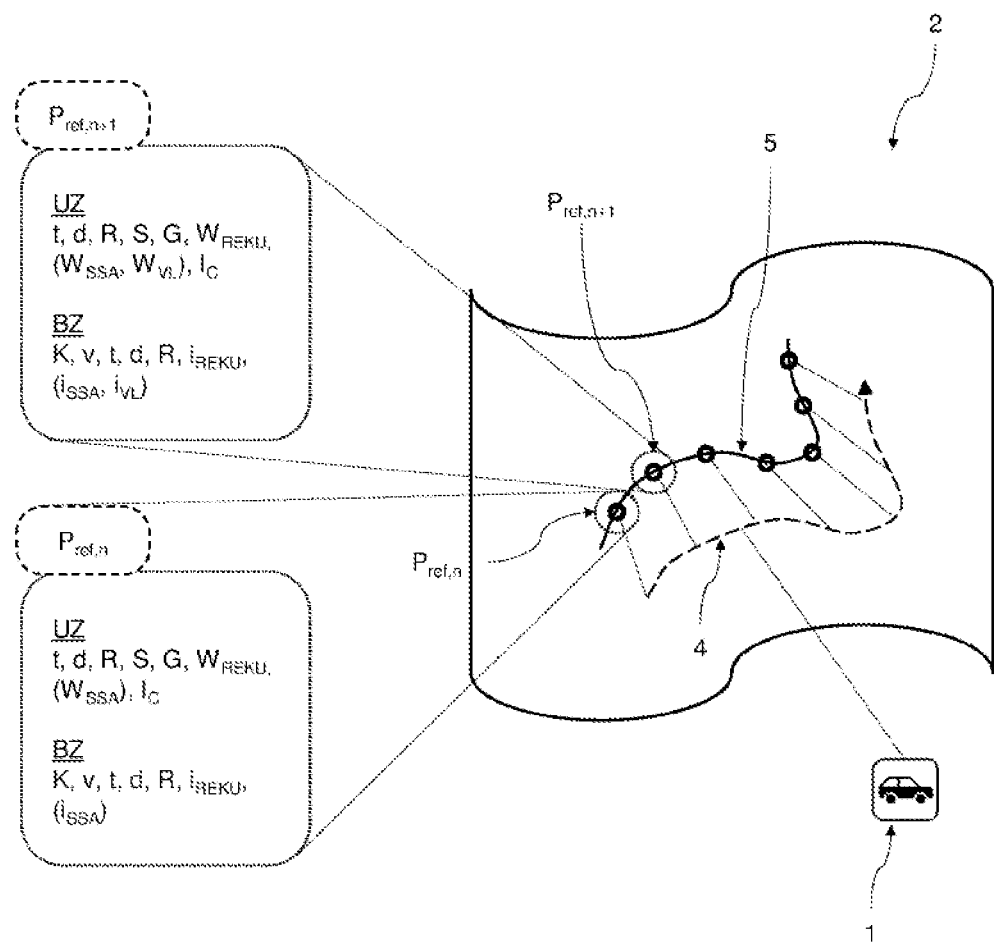
FIG. 3 shows a schematic view of a map with which the control device and the database device from FIG. 1 interact, having a plurality of georeference points at which values for parameters are used when carrying out the method according to FIG. 6.
Figure 4:
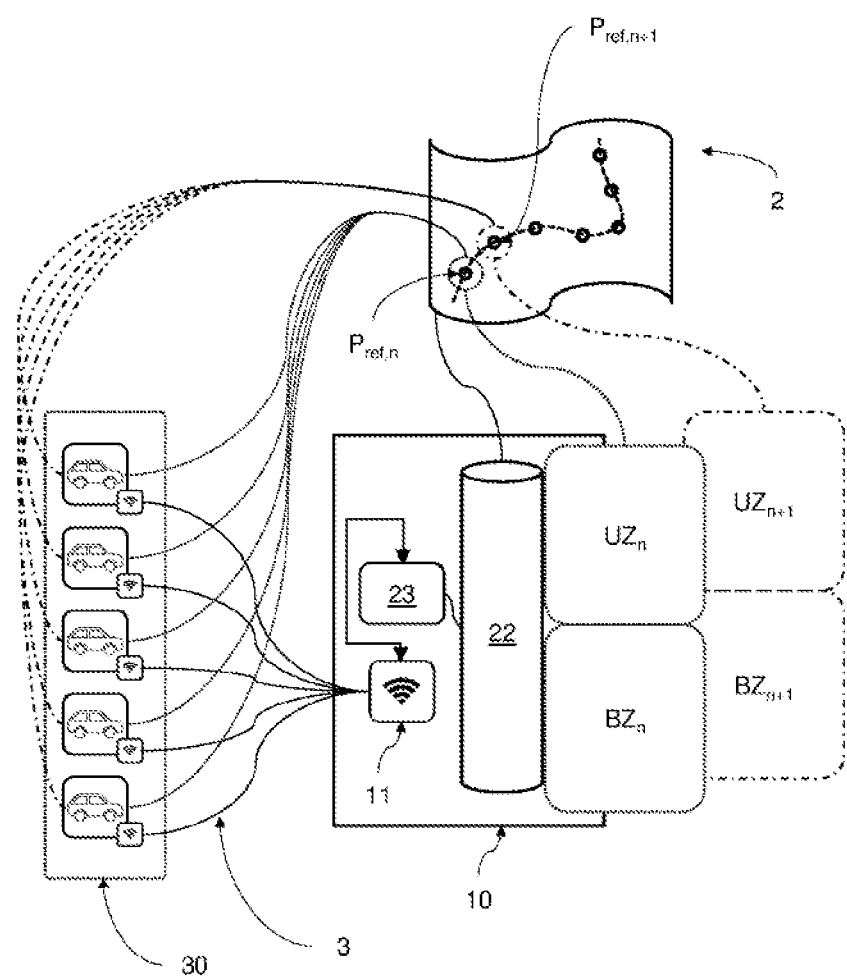
FIG. 4 shows a schematic view of the central database device from FIG. 1 when carrying out the method according to FIG. 6.
Figure 5:
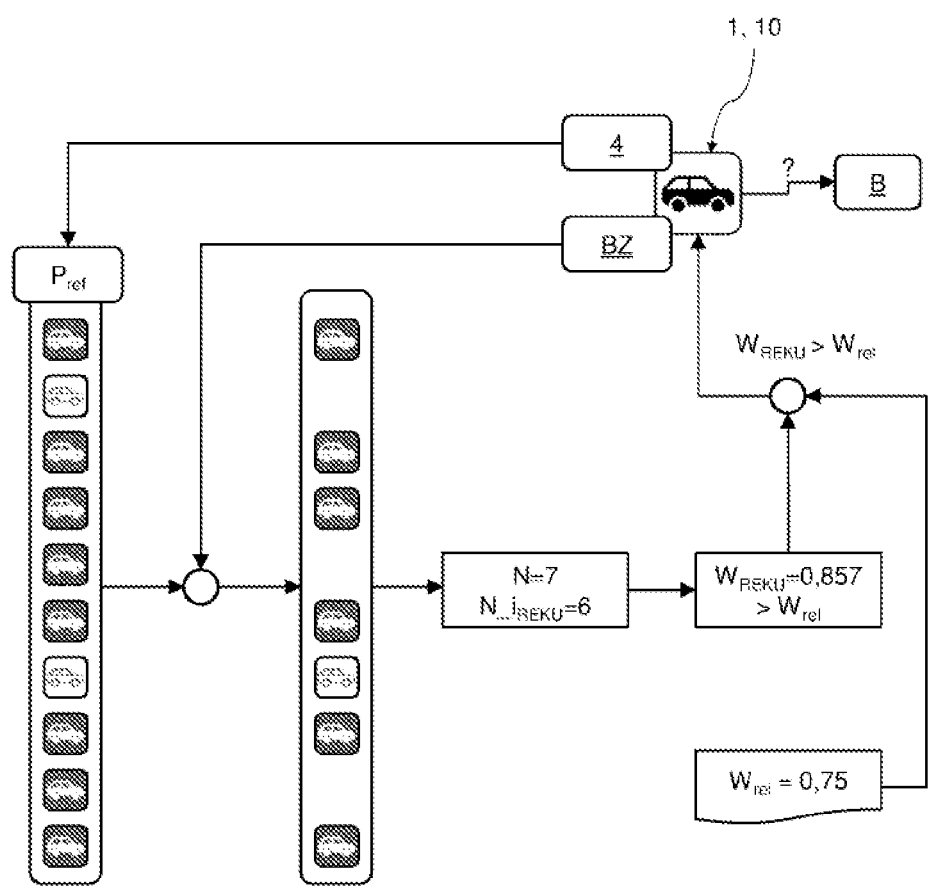
FIG. 5 shows a schematic view of ascertaining a probability of an operating action for relevant third-party vehicles in the context of carrying out the method according to FIG. 6.
Figure 6:
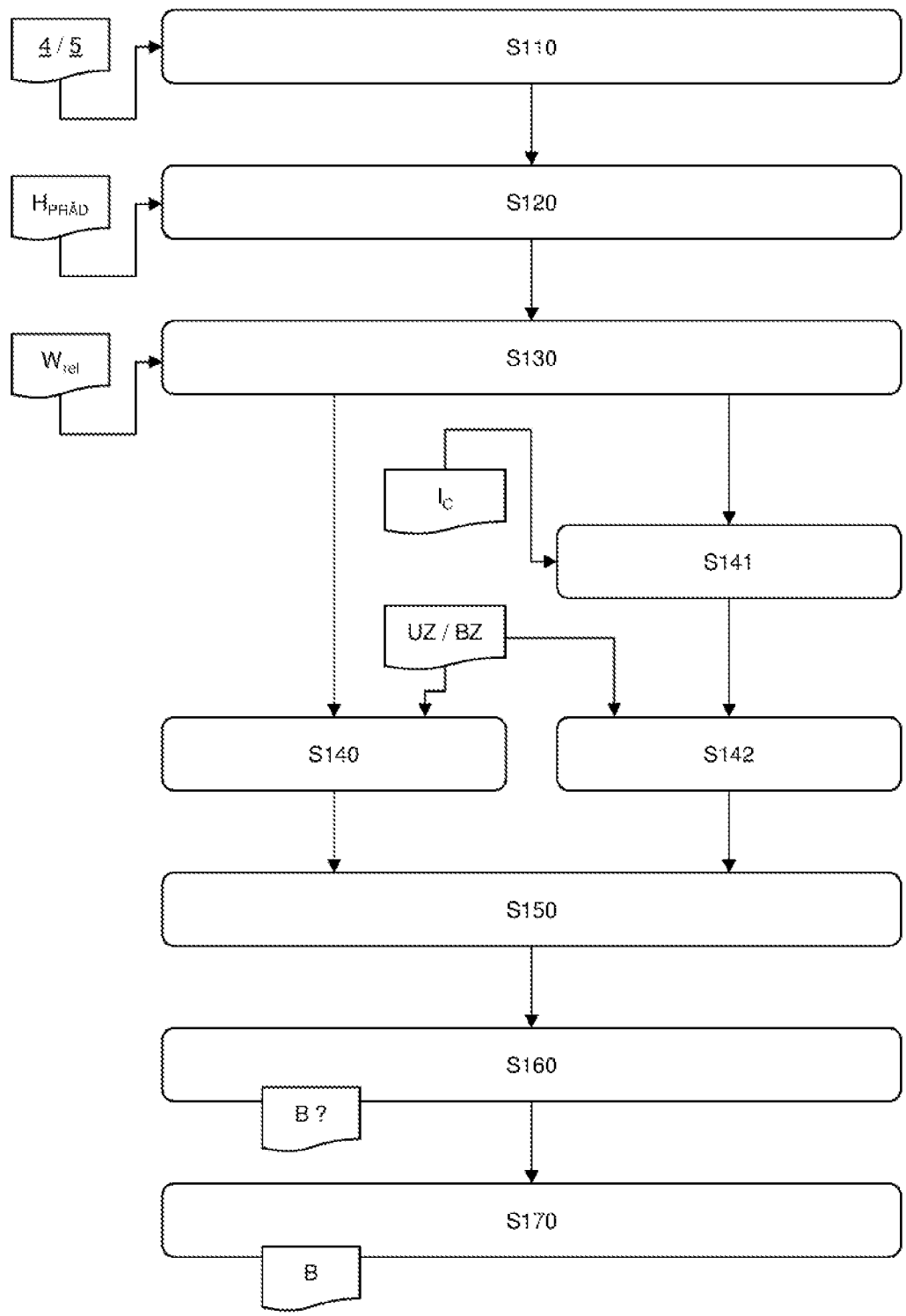
FIG. 6 shows a flowchart for carrying out a method according to an exemplary embodiment of the invention in an arrangement according to FIG. 1.

FIG. 2 also shows details of the information processing in the control device 10. FIG. 3 shows an example of the role of the map 2 in determining the on-board network operating action B. FIG. 4 shows details of the information processing of the data supplied by the vehicles of the fleet 30 in the central database device 20. FIG. 5 shows an example of how the probability $W_{REKU}$ of a third-party vehicle operating action REKU can be ascertained and used in the vehicle 1. Finally, FIG. 6 shows an exemplary flowchart for important method steps of the exemplary method.

FIG. 2 shows how the input unit 12 can use the communication device 11 of the control device 10 to ascertain the required parameter values for describing a current or future relevant operating state BZ and environmental state UZ.

Firstly, a higher-level vehicle control system, not shown, provides an expected route 4 (compare FIG. 3), which for the purpose of the exemplary embodiment of the invention is defined by a path of successive georeference points $P_{ref}$.

The environmental status UZ with the corresponding values of the respective associated parameters refers to a specific georeference point, which was determined as relevant by way of the left-hand data of the map 2 in the navigation system (see FIG. 6, S110), in the typical case, because this point will lie on the expected route 4 in the near future. The expected route 4 is indicated by a path of adjacent georeference points $P_{ref,n}$ to $P_{ref,n+x}$. In FIG. 2, dotted lines are used to indicate symbolically the georeference point $P_{ref,n}$ to which the displayed information processing refers. In FIG. 3, this reference to the expected route 4 is entered symbolically on the map 2.

The operating mode BZ with the corresponding values of the respective associated parameters refers in the exemplary embodiment to the current status of the vehicle 1 or its on-board network 15.

A value for each of the operational parameters BZ and environmental parameters UZ (at $P_{ref,n}$) entered in FIG. 2 is thus now available to the input unit 12 and is forwarded to the processing unit 13.

For each relevant georeference point $P_{ref}$, the processing unit 13 can thus now access the current operating status BZ of the on-board network 15 and the vehicle 1, as well as the environmental status UZ of the relevant georeference point $P_{ref}$ for decision-making about possible on-board network operating actions B. In the exemplary embodiment the latter contains in particular a value $W_{REKU}$ for the probability of the third-party vehicle operating action REKU.

On the basis of this information, a learning unit 16 of the processing unit 13 proposes a suitable operating action B which corresponds to a predefined operating strategy, possibly supplemented and/or replaced by previous learning processes. A reflex unit 17 of the processing unit 13 verifies the proposed operating action B for compatibility with a predetermined strategy and sends a reward or penalty to the learning unit 16 depending on the result of the check. If the action B is rejected by the reflex unit 17, the reflex unit 17 can also forward a modified, permitted operating action B' to the output unit 14. The task of the output unit 14 is to activate an operating action B (or B') that has been decided upon (see FIG. 6, S160) in the on-board network 15.

The resulting change in the operating state BZ can be fed back directly to the input unit 12, or to the learning unit 16 in abstracted form as a delayed reward/penalty.

In the exemplary embodiment described here, a typical possible on-board network operating action B is a conditioning of the energy storage unit E of the motor vehicle, in particular in the sense of a deliberate discharge if a charge contribution is expected (indicator: high probability of regeneration for the next georeference point or points) or in the sense of a deliberate recharging in the case of an expected discharge contribution (indicator: high start/stop probability for the next georeference point or points).

FIG. 3 shows which information is stored in the database memory 22 depending on an associated georeference point $P_{ref}$, and the logic which is used to query this information by the control device 10 of the motor vehicle 1.

Due to the integration of the navigation system with its stored map 2, the control device 10 has knowledge of an expected route 4, which is defined by a path 5 in successively adjacent georeference points $P_{ref}$. In order to obtain information about the environmental status UZ of the georeference points $P_{ref}$ soon to be passed, the control device 10 uses the communication device 11 to query the central database device 20 for the information stored for the corresponding points $P_{ref}$. These may be parameters of the operating state of third-party vehicles from the fleet 30, if necessary, but are normally at least the parameters of the environmental state UZ. In this case, therefore, in particular also the probability of a regeneration operating action B in those third-party vehicles that have already passed the relevant georeference point earlier and have deposited a data record to this effect in the central database facility 20.

As can be seen from FIG. 4, for each georeference point $P_{ref}$ on the map 2 the database memory 22 thus stores a data record which contains the definition of the point and its environmental state UZ, as well as a plurality of operating states of those vehicles of the fleet 30 that have already passed the georeference point $P_{ref}$ at an earlier point in time.

FIG. 5 shows how a probability of the presence of a specific third-party vehicle operating action, in this case a probability for the presence of a regeneration operating action REKU, can be ascertained from this data.

This probability can optionally be ascertained by way of the computing server 23 of the database device 20 and transmitted pre-determined to the control device 10 of the vehicle 1, or the stored bases for the calculation are transferred to the control device 10 and the calculation itself is carried out there. In both cases, the calculation can be carried out as shown in FIG. 5.

The vehicle 1 uses its control device 10 (not shown in FIG. 5) to query the data records for the associated georeference point(s) $P_{ref}$ taking into account the expected route 4.

The respective data record stores how many vehicles have passed the corresponding georeference point in the past. In FIG. 5, as a rough simplification, ten vehicles are shown. The data record shows that for eight vehicles the indicator $i_{REKU}$ for the presence of a regeneration operating action REKU is set (dark background icons), but for two other vehicles it is not (light background icons).

In an additional step, on the basis of the operating status BZ of the vehicle 1, those "historical" third-party vehicles for which the operating state is not sufficiently similar are removed from the analysis.

In the exemplary embodiment, seven relevant vehicles remain, six of which have set the indicator $i_{REKU}$.

This results in a probability $W_{REKU}$ for the presence of a regeneration at the observed georeference point $P_{ref}$ of 6 out of 7, i.e. of 0.857.

This probability $W_{REKU}$ is then compared with a predefined relevance threshold $W_{rel}$, which in the exemplary embodiment has the value 0.75 (see FIG. 6, S130). As the probability is higher than the relevance threshold, it is taken into account in the decision about possible on-board network operating actions B.

In the exemplary embodiment, the decision is taken in particular on the basis of expected (dis)charge quantities or (dis)charge amounts, which are determined depending on the ascertained probabilities $W_{REKU}$ and/or, if applicable, $W_{SSA}$ to be taken into account.

In FIG. 6, individual method steps relating to this are summarized.

In step S110, the expected route 4 along the path 5 with the georeference points $P_{ref}$ located on it is first ascertained.

In step S120—in particular according to FIG. 5—for all georeference points $P_{ref}$ on the path 5 it is ascertained whether they lie within a prediction horizon $H_{PRÄD}$. For those $P_{ref}$ within the prediction horizon $H_{PRÄD}$, the probability $W_{REKU}$ for a regeneration operating action and/or, where applicable, $W_{SSA}$ for a start-stop operating action $W_{SSA}$, is ascertained for the third-party vehicles considered in the fleet 30.

In step S130, the georeference points $P_{ref}$ are identified for which the ascertained value of the probability $W_{REKU}$ (or $W_{SSA}$) is above a relevance threshold $W_{rel}$ in order to identify those cases in which an improvement of the prediction—in particular compared to a physically determined estimate of a (dis)charge contribution—is possible at all.

The expected charge contribution is then determined for all identified georeference points in step S140.

For all other georeference points, by contrast, in step S141 a characteristic indicator IC is determined, which can be derived, for example, from a road type S, a direction of travel R, and/or in particular a gradient G at the relevant georeference point, and which provides an indication as to how reliably an expected charge contribution can be determined on the basis of physical conditions of the environment of the georeference point. Values for the characteristic indicator $I_C$ can be "deterministic" or "probabilistic", for example, depending on whether a specific operating action typically occurs for a given georeference point or whether such a clear indication is not possible.

Following step S141, in step S142 the expected charge quantity tag is determined only for those georeference points with $I_C$="deterministic".

In step S150, the sum of the charge contributions of the individual georeference points to be taken into account along the path 5 of the expected route 4 is transmitted to the input unit 12 (via communication device 11).

In step S160, the processing unit 13 decides on possible operating actions B of the on-board network 15 on the basis of the transmitted sum.

In step S170, operating action B is performed when the processing unit 13 has instructed the output unit 14 to do so and the output unit 14 has issued a corresponding control command. In the exemplary embodiment, the operating action B is, for example, a conditioning of the energy storage units E of the vehicle 1 with regard to an expected (dis) charge quantity.

This conditioning can involve a targeted discharging of the energy storage unit E if a higher charge quantity, soon to be available, is expected on the basis of a probability $W_{REKU}$.

On the other hand, the conditioning can involve a targeted charging of the energy storage unit E if a higher charge quantity, soon to be required, is expected on the basis of a probability $W_{SSA}$.

LIST OF REFERENCE SIGNS 1 motor vehicle
2 road map
3 mobile communications network
4 expected route
5 path
10 control device
11 communication device
12 input unit
13 processing unit
14 output unit
15 on-board electrical network
16 learning unit
17 reflex unit
20 database device
21 communication device
22 database memory
23 computing server
30 third-party vehicle fleet
B on-board network action
BZ operating state
d type of day
E energy store
G gradient/slope
$H_{präd}$ prediction horizon
$I_C$ characteristic indicator
K vehicle class and/or weight class
$P_{ref}$ georeference point
t time of day
UZ environmental condition
R direction of travel
REKU operating action regeneration
$i_{REKU}$ indicator for regeneration on/off/degree
S road type
SSA operating action Start-Stop-automatic
$i_{SSA}$ indicator for automatic start/stop with internal combustion engine off/on
v vehicle speed
$W_{REKU}$ regeneration probability
$W_{rel}$ relevance threshold
$W_{SSA}$ start/stop probability

The invention claimed is:

1. A control device for operating an on-board power supply system of a motor vehicle, the control device comprising:
    a processing unit; and an input unit which is configured to receive operating parameters of the on-board power supply system of the motor vehicle and environmental parameters of the motor vehicle, and to forward the operating parameters of the on-board power supply of the motor vehicle and the environmental parameters of the motor vehicle to the processing unit, wherein:

at least one of the environmental parameters is a probability of a third-party vehicle operating action, the probability is linked to a georeference point, the processing unit is configured to determine an on-board network operating action by comparing, based on a characteristic indicator of the georeference point:
- a first prediction based on physical relationships between the operating parameters and the environmental parameters, and
- a second prediction based on the probability of the third-party vehicle operating action, and the control device is configured to operate the on-board power supply system by activating the on-board network operating action.

2. The control device according to claim 1, wherein the processing unit is configured:
to determine the on-board network operating action depending on a plurality of probabilities of the third-party vehicle operating action, wherein the probabilities are ascertained for successive georeference points along an expected route of the motor vehicle.

3. The control device according to claim 2, wherein a set of the successive georeference points is limited by a prediction horizon.

4. The control device according to claim 2, wherein the on-board network operating action is determined based only on a subset of the georeference points of which an ascertained probability value for the third-party vehicle operating action meets at least one relevance threshold.

5. The control device according to claim 1, wherein the third-party vehicle operating action for which the probability is ascertained is at least one of:
- a regeneration operation of an electric drive unit of the third-party vehicle, and/or
- a temporary shutdown of an internal combustion engine of the third-party vehicle followed by a restart, or
- a consumer power demand in the on-board power supply system that is above a first limit or below a second limit.

6. A central database device, wherein the central database device is configured:
- to receive an indicator value for the third-party vehicle operating action at the georeference point from a plurality of third-party vehicles,
- to ascertain the probability of the third-party vehicle operating action at the georeference point from the indicator values, and
- to transmit the probability to the control device according to claim 1.

7. A method for operating an on-board power supply system of a motor vehicle, the method comprising:
determining operating parameters of the on-board power supply system of the motor vehicle and environmental parameters of the motor vehicle, wherein at least one of the environmental parameters is a probability of a third-party vehicle operating action, and the probability is linked to a georeference point, determining an on-board network operating action by comparing, based on a characteristic indicator of the georeference point:
- a first prediction based on physical relationships between the operating parameters and the environmental parameters, and
- a second prediction based on the probability of the third-party vehicle operating action, and operating the on-board power supply system by activating the on-board network operating action.

8. The method according to claim 7, wherein at least one of:
- the on-board network operating action is determined based on a learned operating strategy, or
- the on-board network operating action is verified based on a predefined verification strategy.

* * * * *